US009154649B2

(12) United States Patent
Fujimori et al.

(10) Patent No.: US 9,154,649 B2
(45) Date of Patent: Oct. 6, 2015

(54) DATA READER AND IMAGE FORMING APPARATUS INCORPORATING SAME

(71) Applicants: Akira Fujimori, Kanagawa (JP); Hideki Kosugi, Kanagawa (JP); Tatsuya Kubo, Kanagawa (JP); Kentaro Nodera, Kanagawa (JP); Shinnosuke Koshizuka, Kanagawa (JP); Teppei Kikuchi, Kanagawa (JP)

(72) Inventors: Akira Fujimori, Kanagawa (JP); Hideki Kosugi, Kanagawa (JP); Tatsuya Kubo, Kanagawa (JP); Kentaro Nodera, Kanagawa (JP); Shinnosuke Koshizuka, Kanagawa (JP); Teppei Kikuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/255,206

(22) Filed: Apr. 17, 2014

(65) Prior Publication Data
US 2014/0320906 A1 Oct. 30, 2014

(30) Foreign Application Priority Data

Apr. 30, 2013 (JP) ................................. 2013-096082

(51) Int. Cl.
*H04N 1/00* (2006.01)
*G03G 15/08* (2006.01)
(52) U.S. Cl.
CPC ....... *H04N 1/00339* (2013.01); *G03G 15/0863* (2013.01); *H04N 1/00795* (2013.01)
(58) Field of Classification Search
None
See application file for complete search history.

(56) References Cited

U.S. PATENT DOCUMENTS

| 4,274,697 | A | * | 6/1981 | Dodge et al. ................. 439/455 |
| 4,329,008 | A | * | 5/1982 | Braginetz ....................... 439/80 |
| 4,776,811 | A | * | 10/1988 | Humphrey .................... 439/378 |
| 5,809,377 | A | * | 9/1998 | Chiesa et al. ................. 399/111 |
| 5,856,806 | A | * | 1/1999 | Koleda .......................... 343/702 |
| 6,033,252 | A | * | 3/2000 | Hood et al. ................... 439/374 |
| 6,139,366 | A | * | 10/2000 | van Woensel ............ 439/607.19 |
| 6,254,402 | B1 | * | 7/2001 | Barnes et al. ................... 439/95 |
| 6,290,513 | B1 | * | 9/2001 | Kakinoki et al. ............. 439/108 |

(Continued)

FOREIGN PATENT DOCUMENTS

| JP | 11-348375 | 12/1999 |
| JP | 2009-069417 | 4/2009 |

(Continued)

OTHER PUBLICATIONS

Extended European Search Report issued Sep. 16, 2014, in European Patent Application No. 14163979.9.

*Primary Examiner* — Ted Barnes
(74) *Attorney, Agent, or Firm* — Oblon, McClelland, Maier & Neustadt, L.L.P.

(57) ABSTRACT

A data reader includes a memory board provided to a removable member and a reading member including a reading terminal. The memory board includes a positioning opening, a ground terminal provided to the positioning opening, and a contact terminal. The reading member includes an engagement projection that fits in the positioning opening and is disposed adjacent and parallel to the reading terminal. The engagement projection includes a uniform diameter portion, a tapered portion extending from the uniform diameter portion, and an apparatus-side ground terminal to contact the ground terminal of the memory board when the engagement projection fits in the positioning opening. The apparatus-side ground terminal includes a portion projecting laterally from the uniform diameter portion from an end of the uniform diameter portion toward a reading member base and an extended portion at the end of the uniform diameter portion, covered with the tapered portion.

10 Claims, 14 Drawing Sheets

(56) References Cited

U.S. PATENT DOCUMENTS

| | | | |
|---|---|---|---|
| 6,386,913 B1 * | 5/2002 | Mohammad et al. | 439/579 |
| 6,736,545 B2 * | 5/2004 | Cairns et al. | 385/56 |
| 7,114,958 B2 * | 10/2006 | Angelucci | 439/65 |
| 8,909,071 B2 * | 12/2014 | Takahashi et al. | 399/12 |
| 2004/0061332 A1 * | 4/2004 | Takayanagi et al. | 285/319 |
| 2004/0248476 A1 * | 12/2004 | Zhang | 439/825 |
| 2005/0020136 A1 * | 1/2005 | Johannes et al. | 439/620 |
| 2005/0197016 A1 * | 9/2005 | Moisevenko et al. | 439/638 |
| 2006/0240714 A1 * | 10/2006 | Landgraf | 439/638 |
| 2007/0230999 A1 * | 10/2007 | Shimomura | 399/113 |
| 2007/0280744 A1 | 12/2007 | Kubo et al. | |
| 2008/0199205 A1 | 8/2008 | Kubo et al. | |
| 2008/0199223 A1 | 8/2008 | Tateyama et al. | |
| 2008/0213006 A1 | 9/2008 | Nakayama et al. | |
| 2008/0247786 A1 | 10/2008 | Nakayama et al. | |
| 2009/0067878 A1 | 3/2009 | Tateyama et al. | |
| 2009/0067886 A1 | 3/2009 | Nodera et al. | |
| 2009/0097878 A1 | 4/2009 | Kubo et al. | |
| 2009/0098775 A1 * | 4/2009 | Nightingale | 439/627 |
| 2009/0103954 A1 | 4/2009 | Nakayama et al. | |
| 2010/0279558 A1 * | 11/2010 | Leon et al. | 439/817 |
| 2012/0004655 A1 * | 1/2012 | Kim et al. | 606/41 |
| 2012/0027466 A1 | 2/2012 | Nakayama et al. | |
| 2012/0039627 A1 | 2/2012 | Kubo et al. | |
| 2012/0051797 A1 | 3/2012 | Suzuki et al. | |
| 2012/0056954 A1 * | 3/2012 | Asauchi et al. | 347/86 |
| 2012/0163875 A1 | 6/2012 | Tateyama et al. | |
| 2012/0190252 A1 * | 7/2012 | Pavlinsky et al. | 439/775 |
| 2012/0200871 A1 * | 8/2012 | Takahashi et al. | 358/1.9 |
| 2012/0230735 A1 | 9/2012 | Uchitani et al. | 399/262 |
| 2013/0052888 A1 * | 2/2013 | Wolting et al. | 439/877 |
| 2013/0188985 A1 * | 7/2013 | Takahashi et al. | 399/110 |
| 2013/0223877 A1 * | 8/2013 | Takahashi et al. | 399/113 |
| 2013/0243491 A1 | 9/2013 | Nodera et al. | |
| 2013/0315636 A1 | 11/2013 | Takayama et al. | |
| 2013/0323956 A1 * | 12/2013 | Huang | 439/345 |
| 2014/0003843 A1 | 1/2014 | Suzuki et al. | |
| 2014/0037325 A1 * | 2/2014 | Takahashi et al. | 399/102 |
| 2014/0071211 A1 * | 3/2014 | Kawajiri et al. | 347/86 |
| 2014/0141634 A1 * | 5/2014 | Sasano et al. | 439/108 |
| 2014/0162487 A1 * | 6/2014 | Frederick et al. | 439/370 |

FOREIGN PATENT DOCUMENTS

| | | |
|---|---|---|
| JP | 2012-198499 | 10/2012 |
| WO | WO 2011/155642 A1 | 12/2011 |
| WO | WO 2011155642 A1 * | 12/2011 |

* cited by examiner

FIG. 10A
FIG. 10B
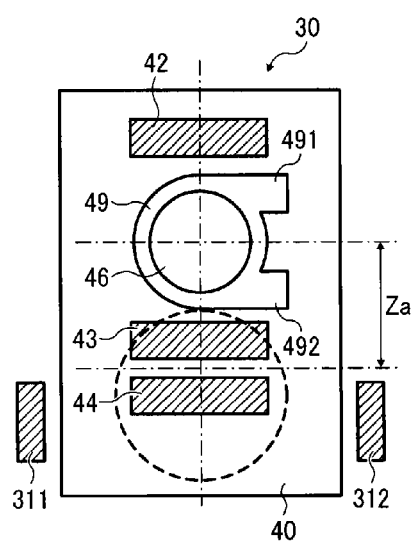
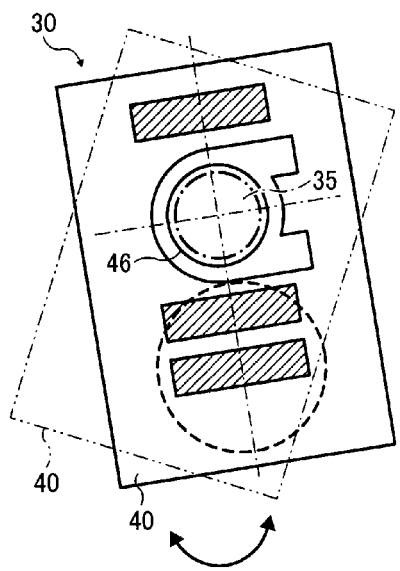

DATA READER AND IMAGE FORMING APPARATUS INCORPORATING SAME

CROSS-REFERENCE TO RELATED APPLICATION

This patent application is based on and claims priority pursuant to 35 U.S.C. §119 to Japanese Patent Application No. 2013-096082, filed on Apr. 30, 2013, in the Japan Patent Office, the entire disclosure of which is hereby incorporated by reference herein.

BACKGROUND OF THE INVENTION

1. Technical Field

Embodiments of the present invention generally relate to a data reader to read out data from a memory of a removable member installed in an image forming apparatus, such as a copier, a printer, a facsimile machine, a plotter, or a multifunction machine (so-called multifunction peripheral or MFP) having at least two of coping, printing, facsimile transmission, plotting, and scanning capabilities and further relate to an image forming apparatus incorporating the data reader.

2. Description of the Background Art

Generally, electrophotographic image forming apparatuses such as copiers, printers, facsimile machines, or multifunction machines (MFPs) include a latent image bearer such as a photoreceptor drum or a photosensitive belt, a developing device, and the like, and direct laser beams onto the surface of the latent image bearer, thereby forming electrostatic latent images according to image data. The electrostatic latent image is developed with toner by the developing device.

As toner in the developing device is thus consumed, the image forming apparatus is typically provided with a replaceable toner container (i.e., a toner cartridge) to supply toner therefrom to the developing device. Toner cartridges are provided with an identification chip (ID) board (hereinafter simply "ID chip"). For example, the ID chip is attached to an end face of the toner cartridge. The ID chip includes a memory to store data such as the amount of remaining toner, compatibility with a body of the image forming apparatus (hereinafter "apparatus body"), serial number, and the like.

Additionally, the image forming apparatus is provided with a data reader to electrically connect the ID chip to the apparatus body simultaneously when the toner cartridge to which the ID chip is attached is installed in a container mount in the apparatus body to enable the apparatus body to read out data from the ID chip.

For example, JP-2009-069417-A proposes a contact-type data reader including an engaging device to engage the apparatus body and the toner cartridge with each other while determining relative positions therebetween. The engaging device is provided with an electrode pin on the apparatus side (hereinafter also "apparatus-side electrode") and an electrode pin on the cartridge side (hereinafter also "chip-side electrode"), which slide on and contact to each other, thereby enabling the apparatus body to read out data from the ID chip. Additionally, there are contactless data readers to read out data from the ID chip via an antenna such as those proposed in JP-2012-198499-A.

Contact-type data readers and contactless data readers have merits and demerits respectively. To reduce the size and cost of the image forming apparatus, contactless data readers without antennas may be advantageous.

Contact-type data readers of related arts are described below with reference to FIGS. 11A through 12C.

FIGS. 11A through 11C illustrate a contact-type data reader 211 provided to a toner container mount 201 of an image forming apparatus. A toner cartridge 202 is inserted into the toner container mount 201 in the longitudinal direction of the toner cartridge 202. A cap 203 is provided to an end of the toner cartridge 202 in the longitudinal direction thereof. The cap 203 is removably fitted in a receiving portion 204 of the toner container mount 201, and the positioning thereof is determined thereby.

When the cap 203 is fitted in the receiving portion 204 of the toner container mount 201, an ID chip 206 (a memory) on an end face 205 of the cap 203 faces a connector 208 held by a base frame 207 of the toner container mount 201. At that time, as shown in FIG. 11C, four electrode pins 209, which are like four bent pieces, of the connector 208 contact four electrodes 210, serving as metal terminals, of the ID chip 206. Then, the connector 208 serves as a reading member to read out data relating to the toner cartridge 202 stored in the ID chip 206.

FIGS. 12A through 12C illustrate a contact-type data reader 212, which is provided to the toner container mount 201 similarly to the data reader 211 shown in FIGS. 11A through 11C.

In this configuration, as shown in FIGS. 12A through 12C, a pair of projections 218 and three electrode pins 216 interposed therebetween are provided to a connector 213 on the side of the base frame 207. Each electrode pin 216 is columnar and arranged vertically. The electrode pins 216 each are constructed of a conductive material and have an identical external diameter.

By contrast, an ID chip 214 on an end face of the cap 203 of the toner cartridge 202 is shaped like a rectangular plate, and three through hole electrodes 217 are provided on a first side thereof. The through hole electrodes 217 are arranged in line. Inner circumferential rims of the through hole electrodes 217 are constructed of a conductive material and have an inner diameter slightly smaller than the outer diameter of each electrode pin 216.

When the toner cartridge 202 is attached to the receiving portion 204, the conductive electrode pins 216 of the connector 213 respectively fit in the conductive inner circumferential rims of the through hole electrodes 217 formed in the ID chip 214. Then, the image forming apparatus can read out data stored in the ID chip 214.

SUMMARY OF THE INVENTION

In view of the foregoing, one embodiment of the present invention provides a data reader that includes a memory board provided with a memory and a reading member. The memory board is provided to a removable member removably installed in a mount of an image forming apparatus. The reading member is provided to the mount and including a reading terminal projecting from a reading member base to read out data from the memory. The memory board further includes a positioning opening, a ground terminal provided to the positioning opening, and a planar contact terminal disposed parallel to the ground terminal and configured to contact the reading terminal. The reading member includes an engagement projection configured to fit in the positioning opening and disposed adjacent and parallel to the reading terminal. The engagement projection includes a uniform diameter portion standing on the reading member base, a tapered portion extending from an end of the uniform diameter portion, and an apparatus-side ground terminal to contact the ground terminal of the memory board when the engagement projection fits in the positioning opening. The apparatus-side ground terminal projects laterally from the uniform diameter portion in a portion extending from the end of the uniform diameter portion toward the reading member base, and the apparatus side ground terminal includes an extended portion extending from the end of the uniform diameter portion and covered with the tapered portion of the engagement projection.

Another embodiment provides an image forming apparatus that includes the above-described data reader.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10A is a front view of the ID chip shown in FIG. 9A, retained at a predetermined position by a retainer;

FIG. 10B is a front view of the ID chip shown in FIG. 9A, swinging with a positioning hole fitting around a uniform diameter portion;

DETAILED DESCRIPTION

Figure 1:
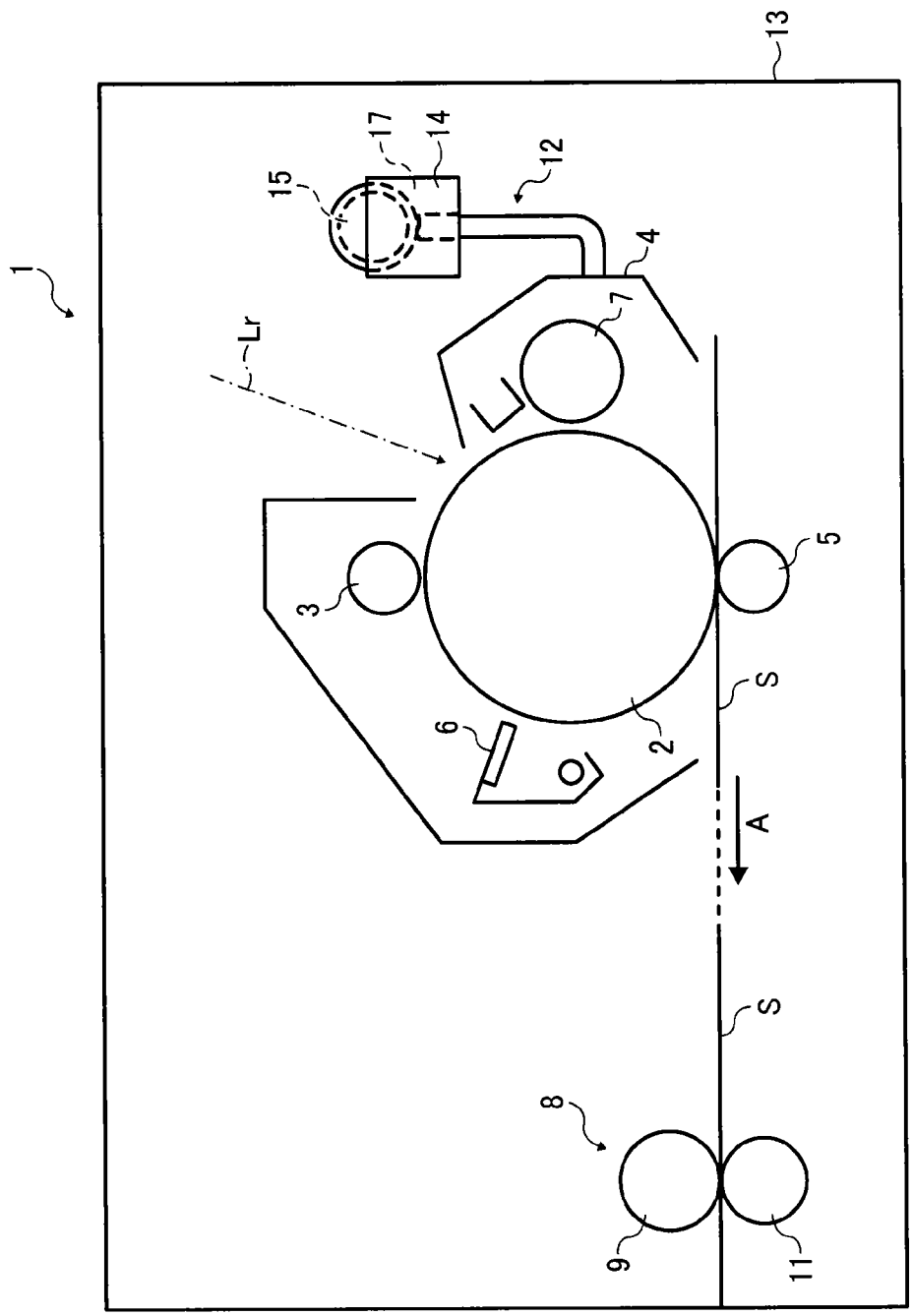
FIG. 1 is a schematic view of an image forming apparatus incorporating a data reader according to an embodiment.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In conventional contact-type data readers, an electrode of an ID chip board provided to a removable member and that of a contact-type reading member are brought closer to contact each other along a slide rail. In connecting the chip-side electrodes to electrodes of the reading member (i.e., apparatus-side electrodes), positional deviation may arise. In the event of positional deviation, proper electrical connection between the ID chip and the reading member is not established, and data is not read out from the ID chip.

Accordingly, it is preferred to improve positional accuracy in attaching the removable member to a predetermined portion of an apparatus body to avoid positional deviation, but it may result in increases in the cost of a portion to which the removable member is attached and difficulty in handling.

If accurate positioning of the removable member (such as a toner cartridge) relative to the predetermined portion is difficult, a deviation can easily arise in relative positions of the chip-side electrodes and the apparatus-side electrodes.

For example, the end of the apparatus-side electrode may hit and deform the circumference of the chip-side electrode, thus disturbing the electric connection therebetween.

At that time, if an unground electrode among multiple apparatus-side electrodes is electrically connected to the chip-side electrode before a ground electrode is electrically connected, overcurrent may arise in the circuit of the ID chip, damaging the circuit. In this respect as well, properly connection of the ground electrode is necessary.

In view of the foregoing, an aim of the embodiment described below is to provide a data reader capable of securing electrical connection between the electrode of the ID chip board of the removable member and the electrode of the reading member and further to provide an image forming apparatus including the data reader.

The embodiment described below concerns data reading by a data reader of an image forming apparatus from a memory provided in a removable member at the time when the removable member is installed in the image forming apparatus.

Specifically, the reading member includes an engagement projection of on the apparatus side fits in a positioning opening formed in a memory board owing to deviation correction capability of a tapered portion thereof, thereby determining a position relative to the removable member. Simultaneously, an apparatus-side ground terminal of the engagement projection can reliably contact the ground terminal around the positioning opening formed in the memory board and thus grounded. In addition, another reading terminal of the reading member contacts a planar contact terminal of the memory board, thereby reading out data from the memory. At that time, an extended portion of the apparatus-side ground terminal of the uniform diameter portion is covered with the tapered portion. Accordingly, insertion of the extended portion into the positioning opening is not blocked, and the extended portion can be inhibited from abutting against the periphery, thus preventing deformation thereof. Further, a secure connection between the apparatus-side ground terminal and the ground terminal of the memory board can inhibit breaking of the electric circuit on the memory board due to overcurrent that arises when the ground is not secured in the electric circuit of the memory.

Referring now to the drawings, wherein like reference numerals designate identical or corresponding parts throughout the several views thereof, and particularly to FIG. 1, a multicolor image forming apparatus according to an embodiment of the present invention is described.

Referring to FIG. 1, an entire configuration of an image forming apparatus including a data reader according to a first embodiment is described below.

An image forming apparatus 1 shown in FIG. 1 includes a photoreceptor drum 2 serving as a latent image bearer. Around the photoreceptor drum 2, a charging roller 3, an exposure device, a developing device 4, a transfer roller 5, and a cleaning unit 6 are provided. The charging roller 3 is disposed either in contact with or adjacent to the photoreceptor drum 2 to charge the photoreceptor drum 2. The exposure device directs a laser beam Lr on the charged photoreceptor drum 2, thereby forming an electrostatic latent image thereon. The developing device 4 supplies toner to the electrostatic latent image and develops it into a toner image. The transfer roller 5 transfers the toner image onto a sheet S of recording media, after which the cleaning unit 6 cleans the photoreceptor drum 2. The developing device 4 includes a developing roller 7 to supply toner to the photoreceptor drum 2 using electrostatic force.

Additionally, a fixing device 8 is provided downstream from the photoreceptor drum 2 in the direction indicated by arrow A in FIG. 1, in which the sheet S is transported (hereinafter "sheet conveyance direction"). The fixing device 8 includes a fixing roller 9 and a pressure roller 11 and fixes the toner image on the sheet S while transporting it between these rollers.

Here, a developer supply portion 12 to supply toner to the developing device 4 is described.

Referring to FIG. 1, the developer supply portion 12 includes a toner container mount 14 held by an apparatus body 13 of the image forming apparatus 1, a toner cartridge 15 held in the toner container mount 14, and a driving unit 17 to transport toner from the toner cartridge 15 to the developing device 4 via a channel 16.

Figure 2:
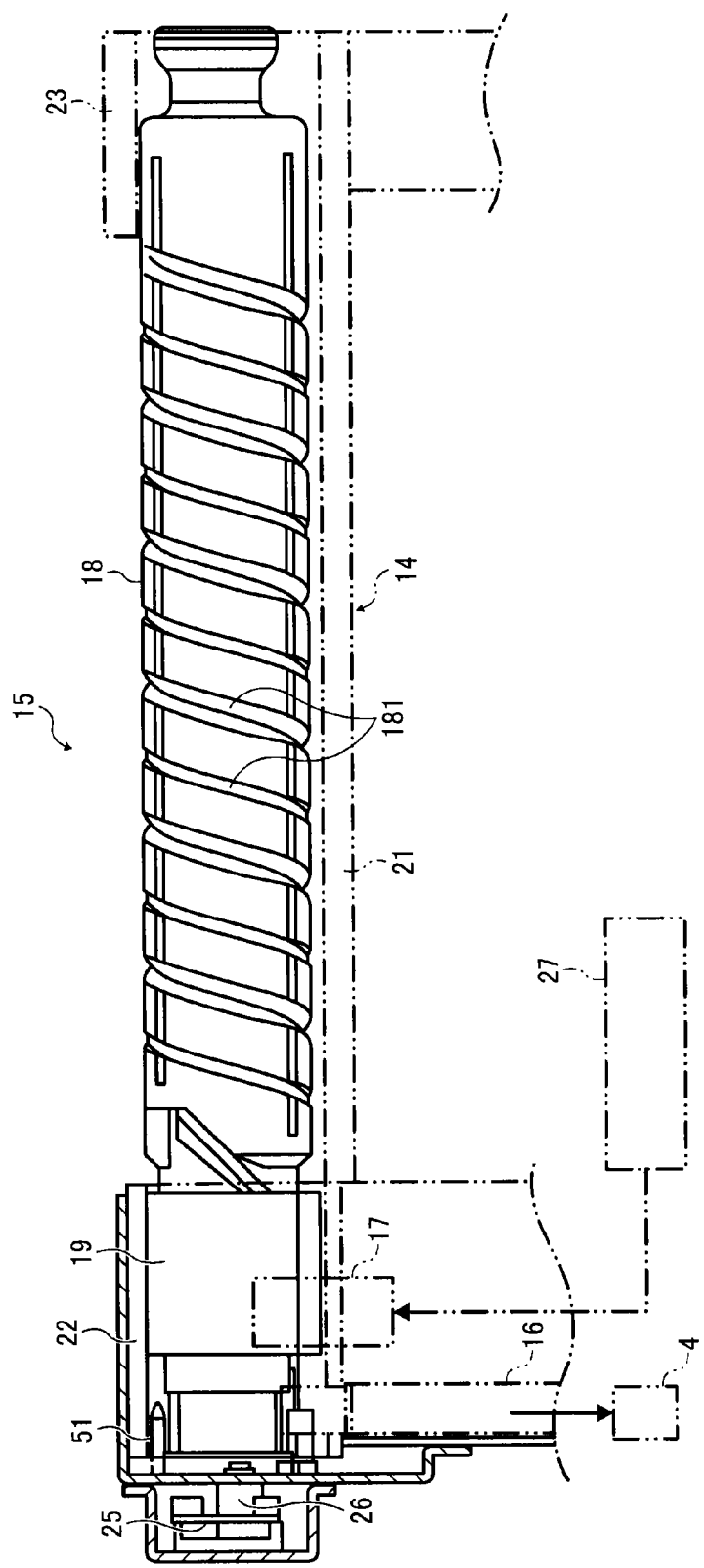
FIG. 2 is an enlarged side view of a toner cartridge used in the image forming apparatus shown in FIG. 1 and illustrates relative positions of the toner cartridge and a holder to hold a bottle cover (i.e., a cap) of the toner cartridge.

The toner cartridge 15 includes a bottle-shaped toner container 18 that stores toner supplied to the developing device 4. As shown in FIG. 2, the toner container 18 containing toner is provided with a cap 19 at one end of the toner container 18, and the toner container mount 14 further includes a cap holder 22 serving as a holder to hold the cap 19. The toner container 18 sends out toner from the cap 19 via the cap holder 22 to the channel 16 connected to the cap holder 22.

Figure 3:
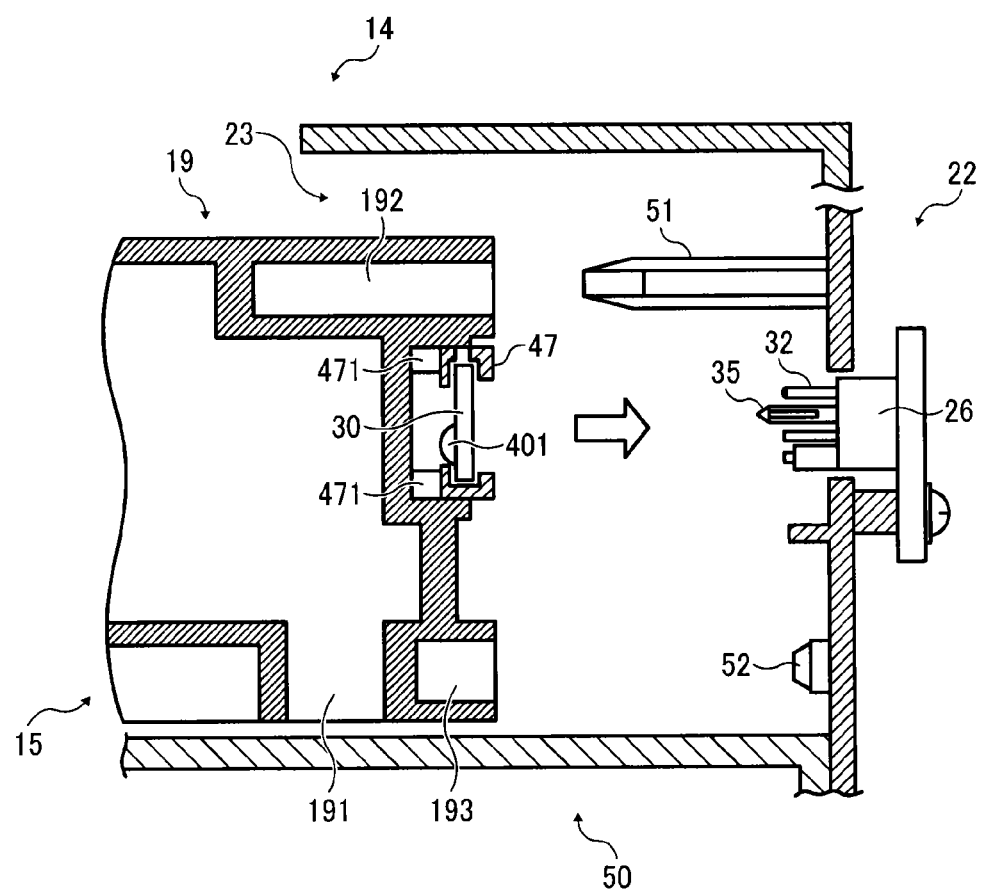
FIG. 3 is a cross-sectional view of a main portion of the data reader shown in FIG. 1.
Figure 4:
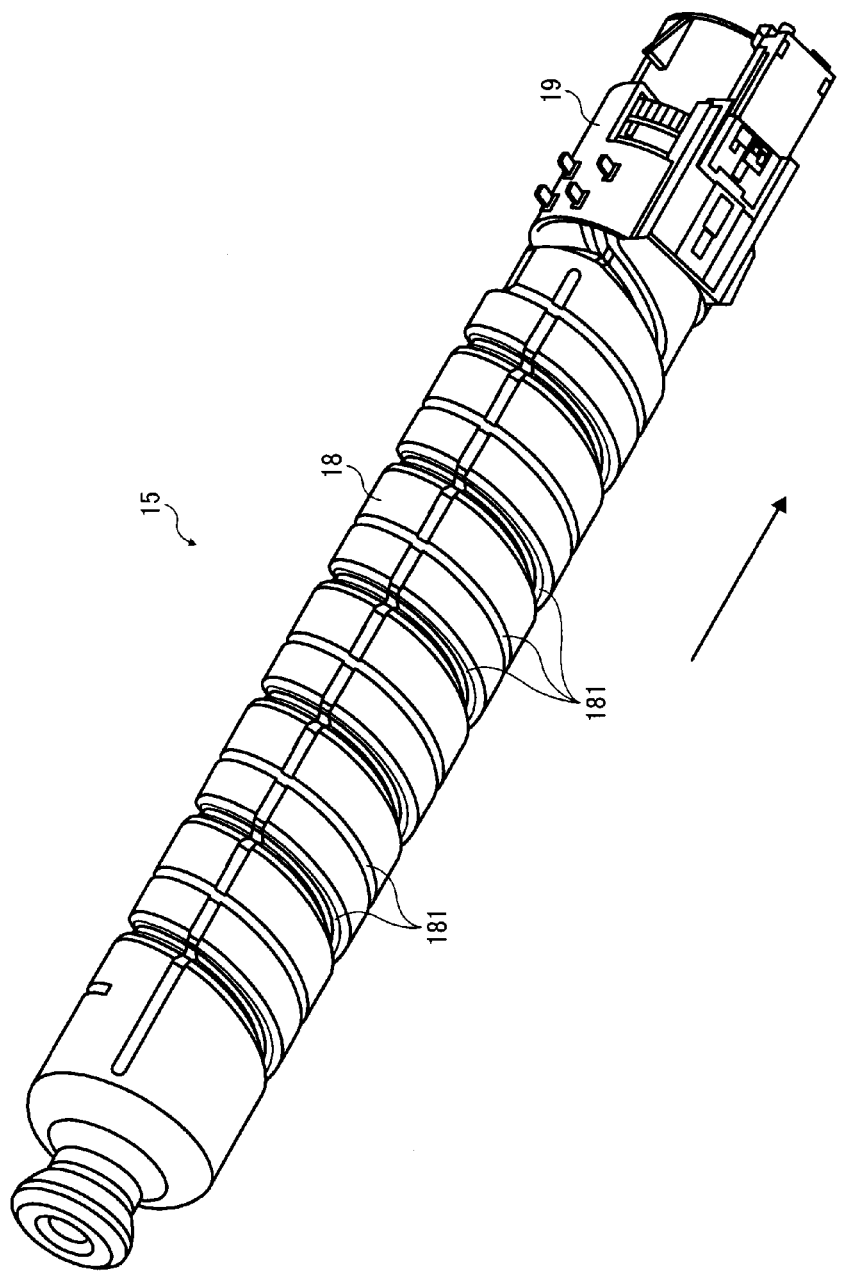
FIG. 4 is an enlarged perspective view of the bottle cover of the toner cartridge shown in FIG. 2, removably installed in the holder of the image forming apparatus.

Additionally, an ID chip 30 shown in FIG. 3 is attached to an end face of the cap 19 (on the left in FIG. 2).

The toner container mount 14 includes a container frame 21 supported by the apparatus body 13, the cap holder 22 attached to and supported by the container frame 21, and an insertion mouth 23 to hold the toner container 18 inserted therein. The cap holder 22 fits around and holds the cap 19 at one end of the toner cartridge 15 inserted therein in the longitudinal direction.

The toner container 18 of the toner cartridge 15 is held rotatably relative to the cap 19 and rotated by the driving unit 17 that includes a driving motor, a driving gear, and the like. A spiral protrusion 181 protruding inward is formed on an inner circumferential face of a body of the toner container 18. As the toner container 18 itself rotates, toner contained therein is transported in the longitudinal direction thereof and discharged from a toner outlet 191 of the cap 19 to the channel 16 via the toner container mount 14. It is to be noted that the toner container 18 is replaced when the service life thereof has expired, that is, almost all toner contained therein is consumed.

As shown in FIGS. 2 and 3, the cap holder 22 attached to the container frame 21 is cylindrical or tubular to removably fit around the cap 19 of the toner cartridge 15. The toner cartridge 15 is inserted into an opening of the tubular cap holder 22 in the longitudinal direction thereof and fitted therein. On the side opposite the opening, an apparatus-side board 25 (cap holder side board) is disposed close and opposed to the end face of the cap 19 of the toner cartridge 15 fitted in the opening.

A connector 26 attached to the apparatus-side board 25 serves as a reading member. The ID chip 30 attached to the end face of the cap 19 is opposed to the connector 26 such that the ID chip 30 can contact the connector 26 and be disengaged therefrom.

The connector 26, serving as the reading member, is connected to a controller 27 of the image forming apparatus 1, and thus a data reader 50 to read out data from the ID chip 30 and output the data to the controller 27 is established. The data read out by the data reader 50 includes data relating to the toner cartridge 15, such as the amount of remaining toner, compatibility with the apparatus body 13, and serial number, stored by the ID chip 30.

As shown in FIGS. 2 and 3, the connector 26 is provided to the cap holder 22 and includes a connector body 31 (shown in FIG. 6) shaped like a hollow box and formed with resin, for example. The cap holder 22 is a base to which the toner cartridge 18 (i.e., the removable member) is mounted. The connector body 31 serves as a base of the connector 26 (i.e., a reading member base).

Figure 5:
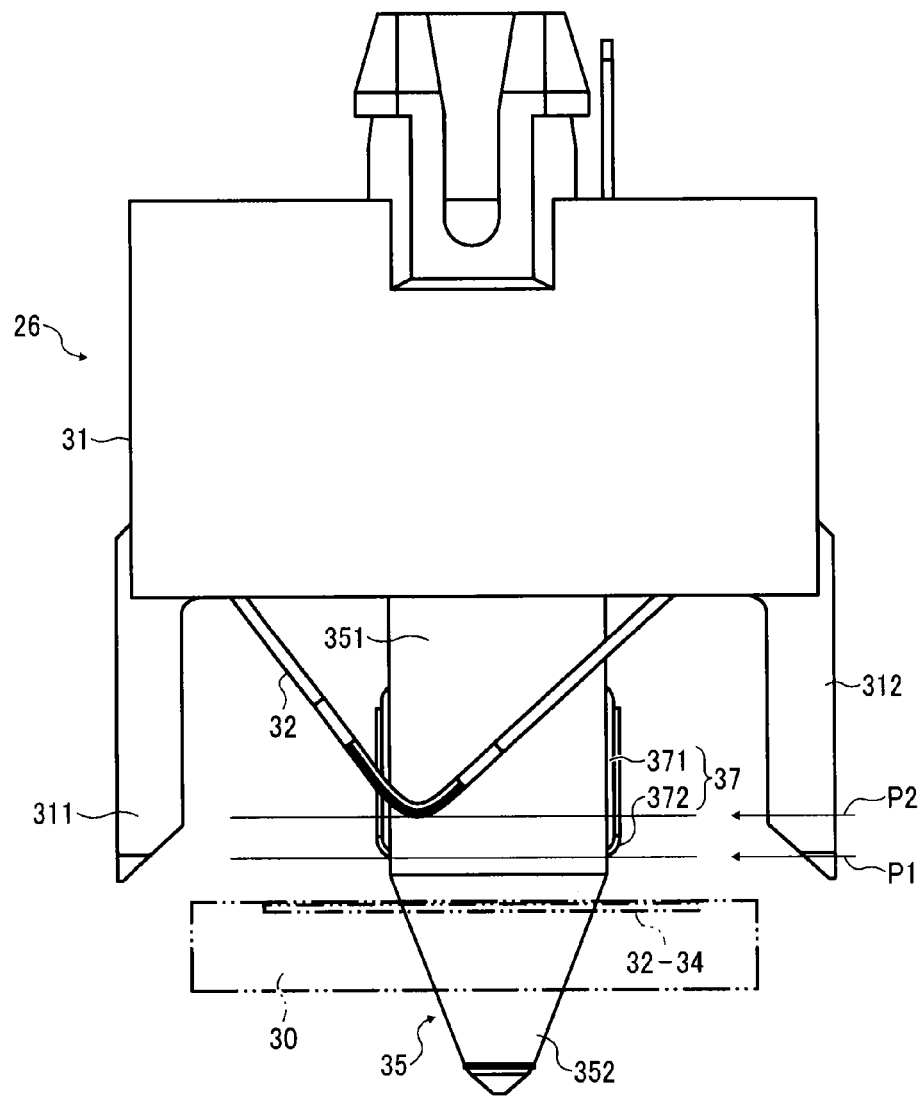
FIG. 5 is an enlarged plan view of the data reader shown in FIG. 1.
Figure 6:
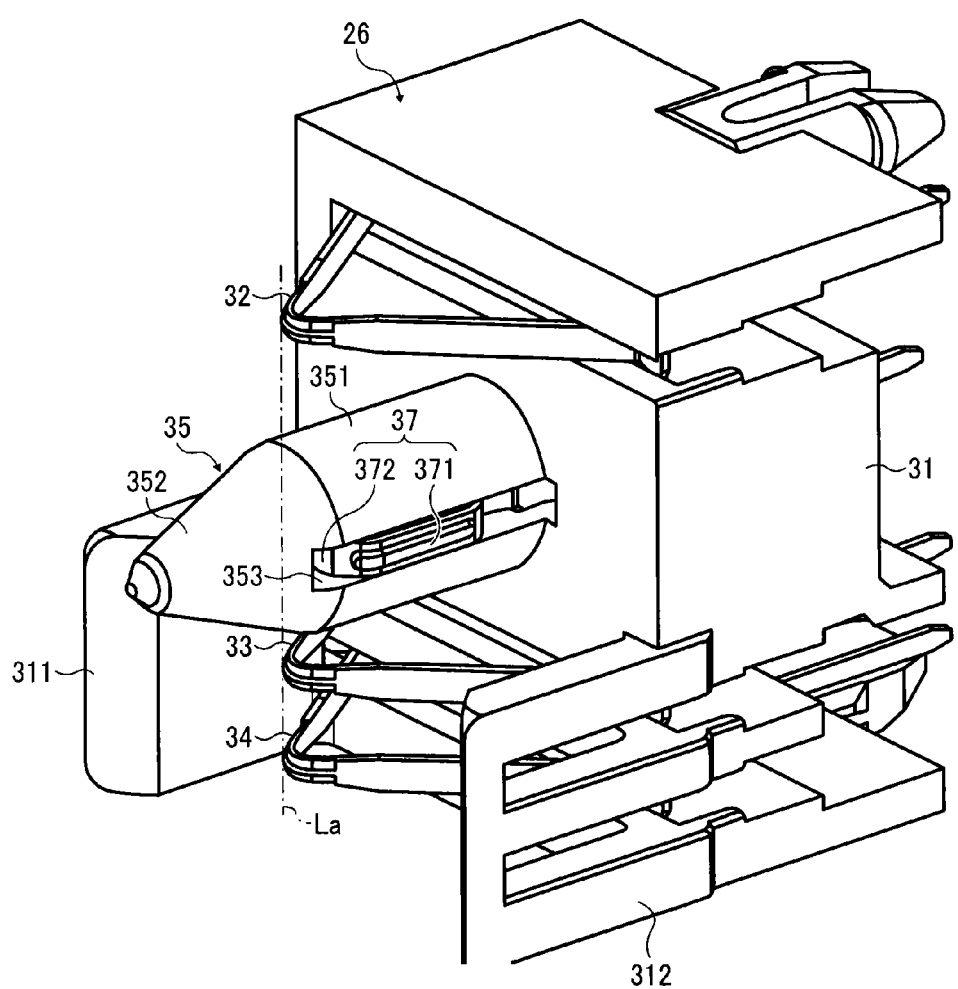
FIG. 6 is an enlarged side view of the data reader shown in FIG. 1.

As shown in FIGS. 5 and 6, the connector body 31 including a leading end face of the connector 26 is provided with three apparatus-side terminals 32, 33, and 34, serving as reading terminals, and an engagement projection 35, serving as a positioning pin, adjacent thereto. The apparatus-side terminals 32, 33, and 34 and the engagement projection 35 extend horizontally in FIG. 6 and are arranged in a vertical direction in FIG. 6 and parallel to each other. The engagement projection 35 fits in a positioning opening 46 described later.

Figure 8:
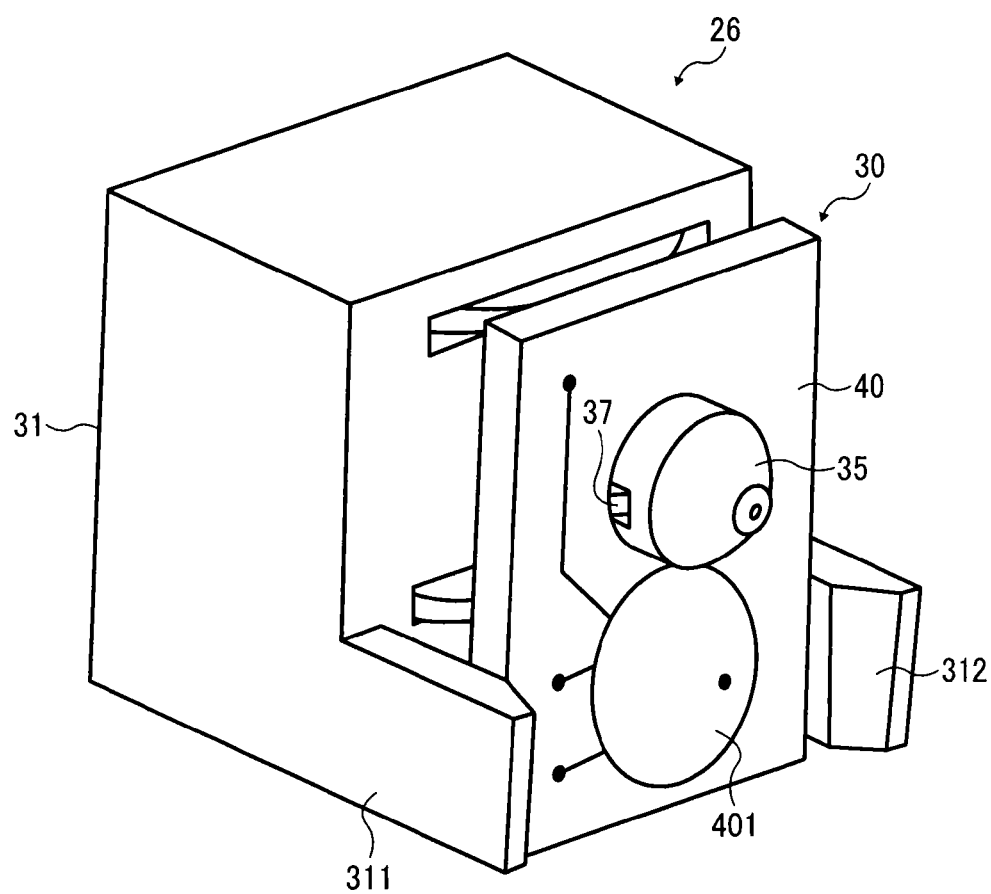
FIG. 8 is a perspective view of the connector shown in FIG. 6, engaged with an ID chip.
Figure 9C:
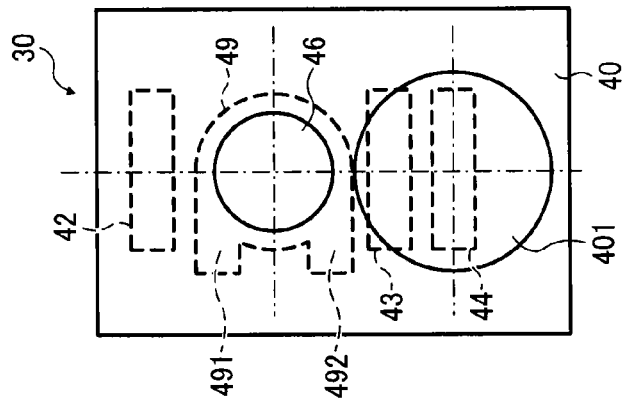
FIG. 9C is a back side view of the ID chip shown in FIG. 9A.

Additionally, a pair of runout preventers 311 and 312 is disposed beneath the connector body 31, and the engagement projection 35 is interposed between the runout preventers 311 and 312. As shown in FIGS. 8 through 9C, the runout preventers 311 and 312 are like ribs and include a tapered face on an inner side of an end thereof, in line symmetry to each other, and thus shaped like ribs. The runout preventers 311 and 312 face side faces of the ID chip 30 at a position vertically lower than a center of the positioning opening 46 (shown in FIG. 7). The runout preventers 311 and 312 regulate the position of the ID chip 30 around a centerline Lp (shown in FIG. 7) of the engagement projection 35.

As shown in FIG. 5, each of the apparatus-side terminals 32, 33, and 34 is curved toward the ID chip 30 (the toner container 18) on an opposite side from a base projecting from the connector body 31. In other words, the apparatus-side terminals 32, 33, and 34 are curved like knees or boomerangs toward the ID chip 30. The curved portions of the apparatus-side terminals 32, 33, and 34 serve as contacts with metal pads 36 through 38 of the ID chip 30. The metal pads 36 through 38 are planar electrodes.

By contrast, as shown in FIG. 5, the engagement projection 35 (ground terminal) includes a uniform diameter portion 351 standing on the connector body 31 and a tapered portion 352 extending from an end of the uniform diameter portion 351.

A containing recess 353 (a long hole or hollow) extends from the uniform diameter portion 351 to the containing recess 353. The containing recess 353 is open in the uniform diameter portion 351, shaped like a slot, and is closed from the outside in the tapered portion 352. The containing recess 353 accommodates an apparatus-side ground terminal 37 (earth terminal), in particular, an extended portion 372 at the end of the apparatus-side ground terminal 37. The apparatus-side ground terminal 37 is contained in and supported by the containing recess 353 so that the apparatus-side ground terminal 37 contacts a ground terminal 49 of a board 40 of the ID chip 30 (hereinafter "ID chip board 40") when the engagement projection 35 is fitted in the positioning opening 46 shown in FIGS. 9A to 9C.

The apparatus-side ground terminal 37 is a planar or linear metal member. A body 371 of the apparatus-side ground terminal 37 is disposed on the uniform diameter portion 351, and the extended portion 372 at an end of the body 371 is covered with the tapered portion 352 extending from the end of the uniform diameter portion 351. Additionally, the body 371 of the apparatus-side ground terminal 37 extends from the end (or a position adjacent thereto) of the uniform diameter portion 351 toward the connector body 31 (reading member base) of the connector 26 and projects laterally from the uniform diameter portion 351.

The connector 26 that is the reading member connects the three apparatus-side terminals 32, 33, and 34 and the apparatus-side ground terminal 37 respectively to metal pads 42, 43, and 44 and the ground terminal 49 of the ID chip 30 attached to the toner cartridge 15. Thus, a main portion of the data reader 50 to read out data from the ID chip 30 and outputs the data to the controller 27 of the image forming apparatus 1 is established.

Thus, the extended portion 372 of the apparatus-side ground terminal 37 supported by the uniform diameter portion 351 is covered with the tapered portion 352. Accordingly, insertion of the extended portion 372 into the positioning opening 46 is not blocked, and the extended portion 372 can be inhibited from abutting against the periphery of the positioning opening 46, thus preventing deformation thereof. Accordingly, the electric connection between the connector 26 of the image forming apparatus 1 and the ID chip 30 (i.e., the ID chip board 40) on the toner cartridge 15, in particular, that between the ground terminals 37 and 49, can be smooth, thus facilitating data reading from the memory on the toner cartridge 15 (i.e., the removable member) and inhibiting beak of the electric circuit on the ID chip board 40 resulting from overcurrent by connection failure.

Next, descriptions are given of the ID chip 30 serving as the memory attached to one end face of the cap 19 of the toner cartridge 15.

Figure 9B:
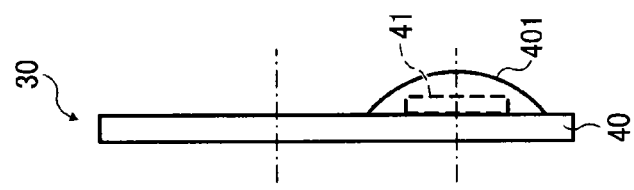
FIG. 9B is a side view of the ID chip shown in FIG. 9A.
Figure 9A:
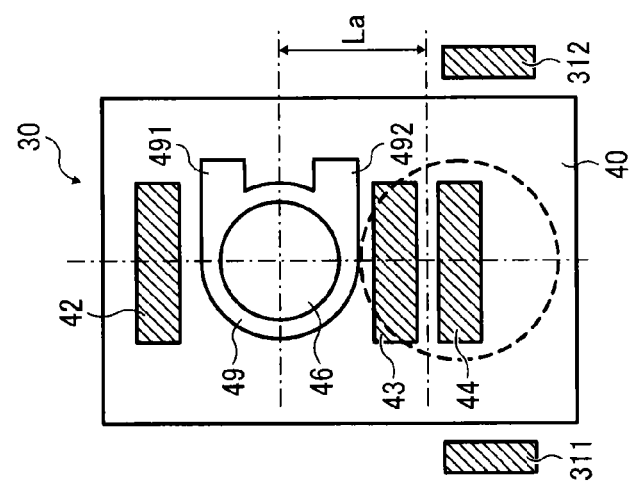
FIG. 9A is a front view of the ID chip of the data reader shown in FIG. 1.
Figure 11A:
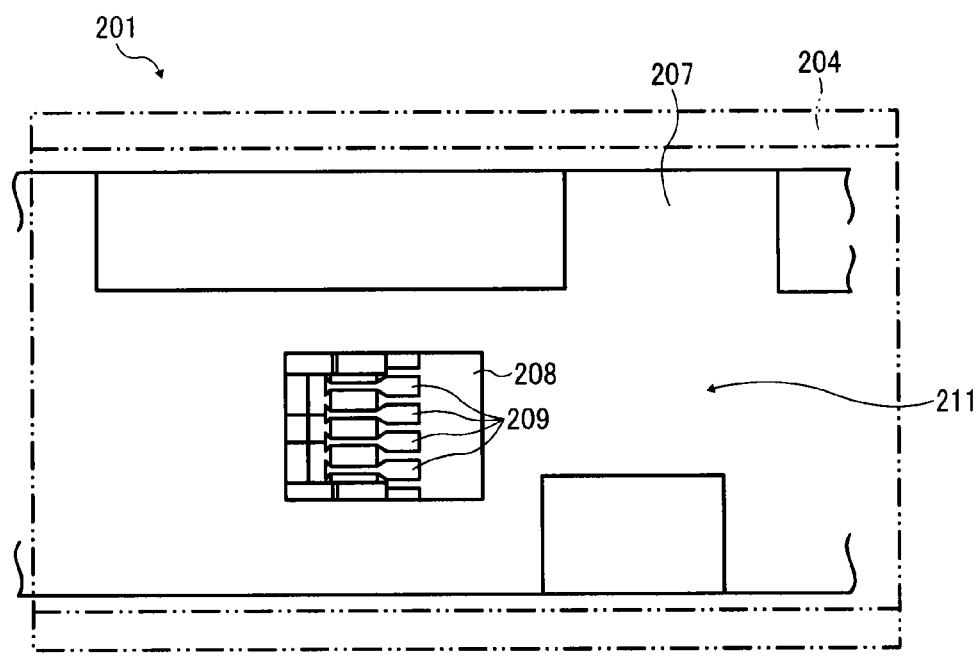
FIGS. 11A and 11B are respectively a front view and a perspective view of a connector of a data reader of a related art.
Figure 11B:
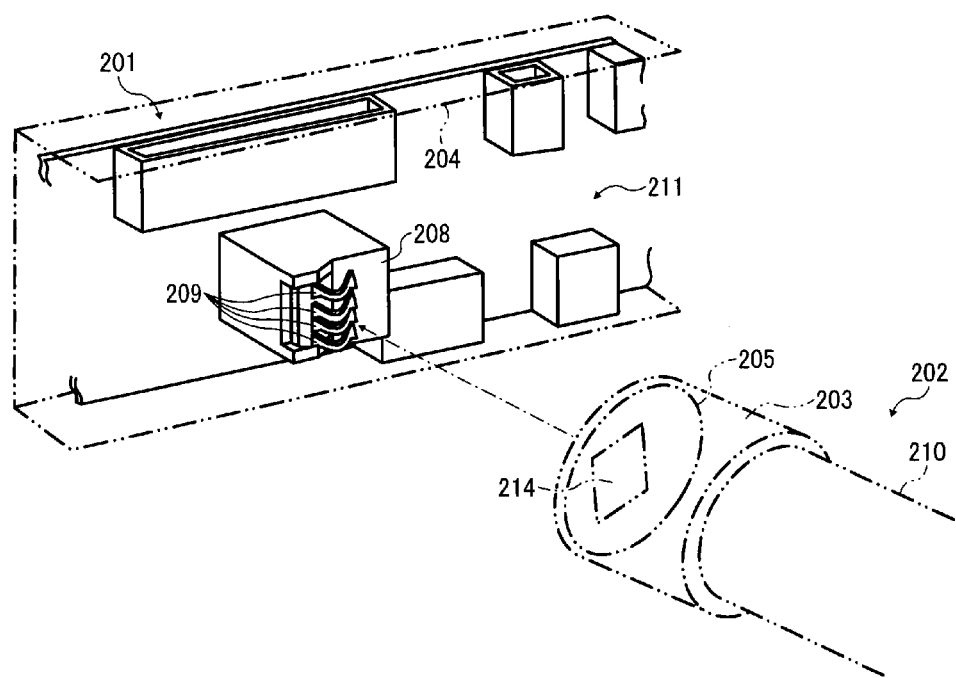
Figure 11C:
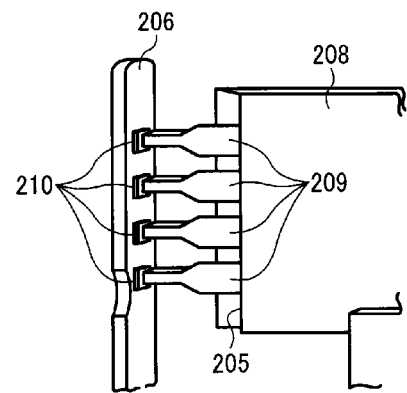
FIG. 11C is a schematic view for understanding of connection of the connector shown in FIGS. 11A and 11B.
Figure 12A:
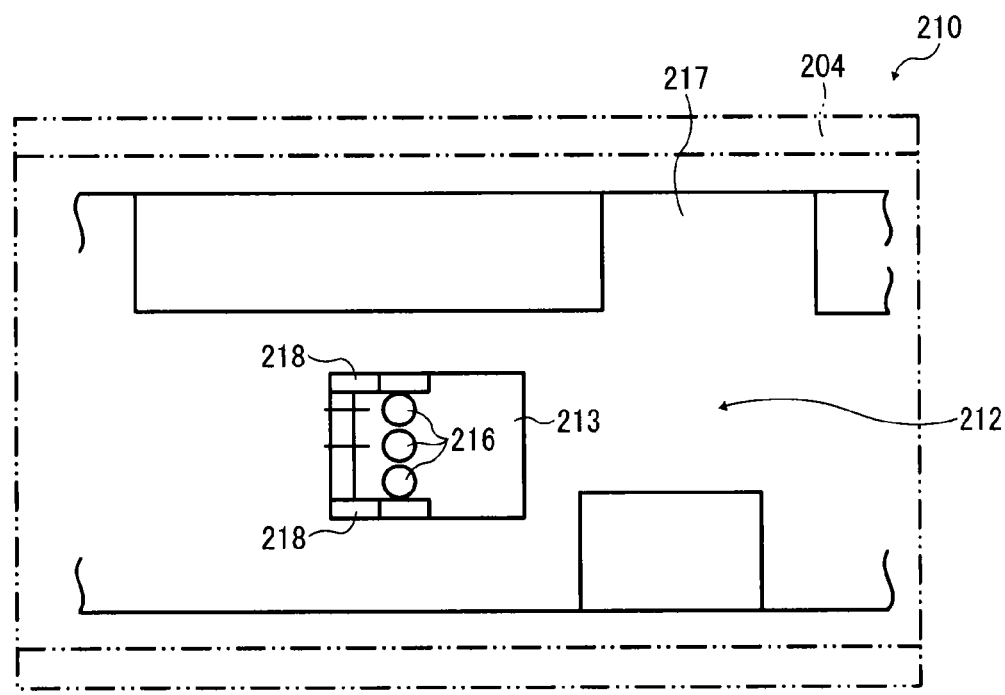
FIGS. 12A and 12B are respectively a front view and a perspective view of a connector of a data reader of another related art.
Figure 12B:
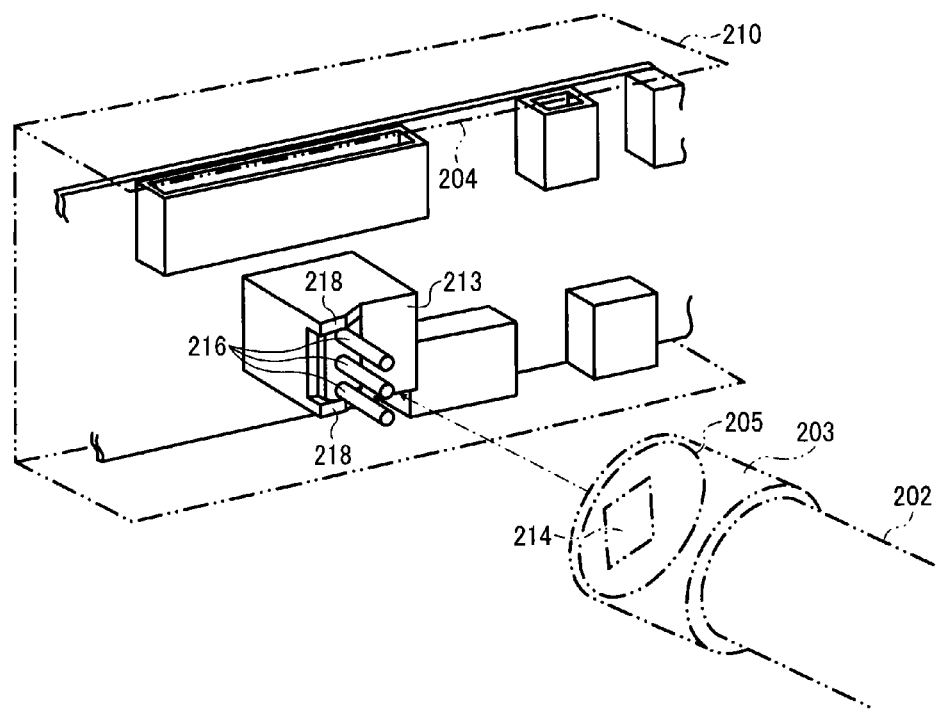
Figure 12C:
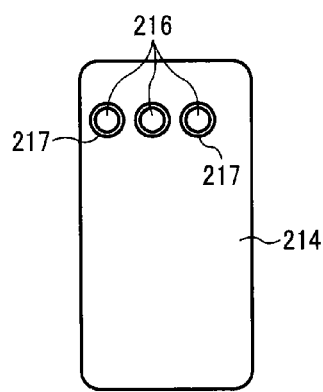
FIG. 12C is a schematic view for understanding of connection of the connector shown in FIGS. 12A and 12B.

As shown in FIGS. 9A through 9C, the ID chip 30 includes the ID chip board 40, a memory portion 41, the metal pads 42, 43, and 44 that are metal plates serving as multiple terminals, and the positioning opening 46 at one of spaces between the rectangular metal pads 42, 43, and 44. The positioning opening 46 is shifted vertically upward from a center of gravity of the ID chip board 40, and interposed between the upper metal pad 42 and the two metal pads 43 and 44 on the lower side. The metal ground terminal 49 is provided at the periphery of the positioning opening 46. In other words, the ground terminal 49 is like a hollow (through hole) electrode in which the positioning opening 46 is formed, and the circumferential face of the positioning opening 46 is formed by the ground terminal 49.

It is to be noted that, in the present embodiment, the ground terminal 49 provided to the surface of the ID chip board 40 is shaped such that two protruding portions 491 and 492 protrude laterally from a circular portion.

The memory portion 41 is an electric circuit that stores various types of data transmitted between the controller 27 of the image forming apparatus 1 and the toner container 18.

The memory portion 41 is disposed on a back side of the ID chip board 40 (a side facing the end face of the cap 19) and is electrically connected to, at least a part of, the metal pads 42, 43, and 44 (metal plates) and the ground terminal 49.

Additionally, the back side of the ID chip board 40 is provided with a protector 401 to cover and protect the memory portion 41. The protector 401 is shaped like a hemisphere face and formed with resin such as epoxy, for example.

Although it depends on the shape, structure, and arrangement of the ID chip board 40, the protector 401, and the like, the positioning opening 46 is positioned above the protector 401, which is a most heavy portion on the back side since the memory portion 41 is contained therein. With such relative positions, the positioning opening 46 is vertically above the center of gravity of the ID chip 30. Specifically, in the ID chip 30 shown in FIG. 10A, the center position of the positioning opening 46 is shifted a distance Za upward from the center of gravity of the ID chip 30, thus enabling a positioning capability under its own weight.

Figure 7:
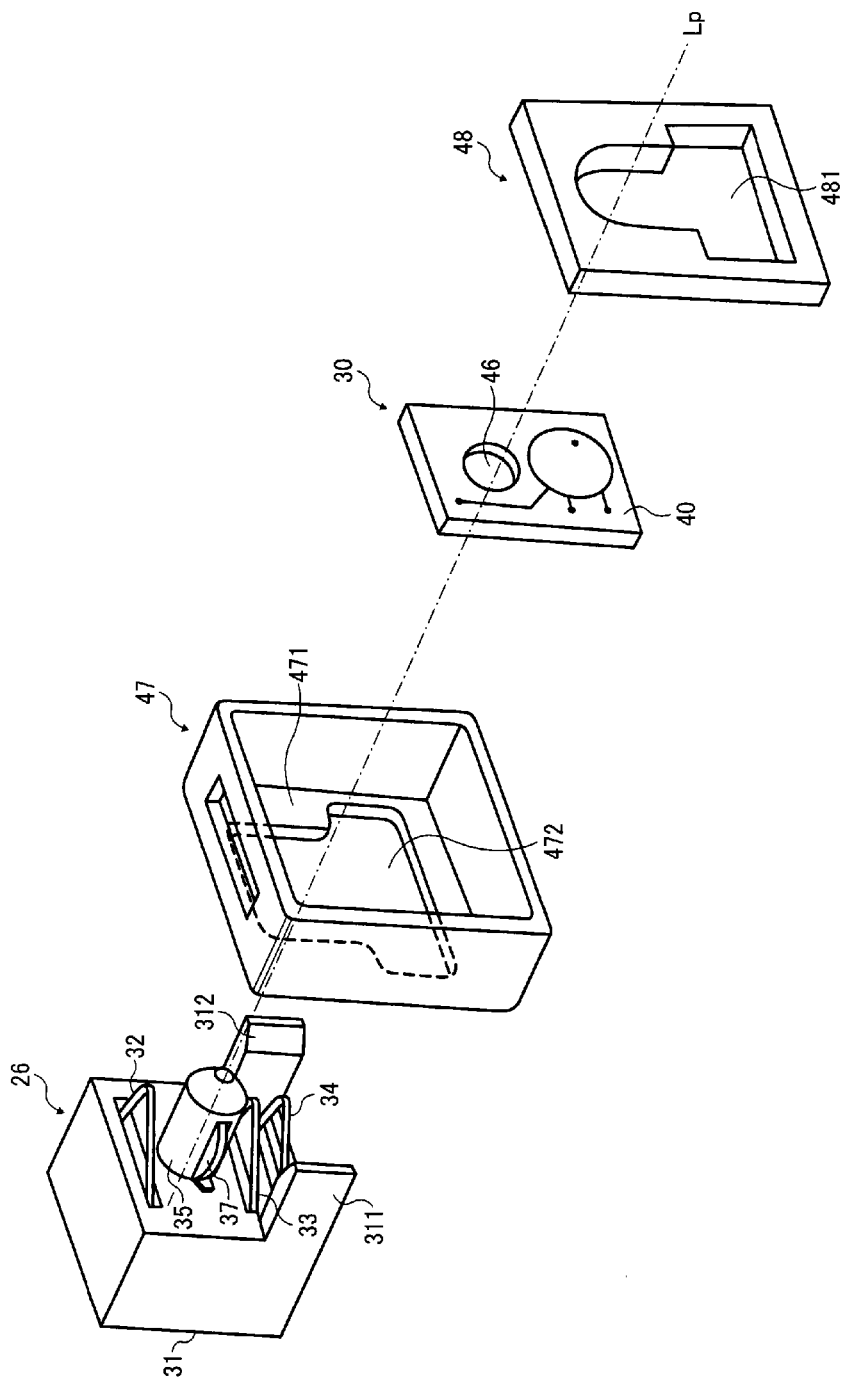
FIG. 7 is an exploded perspective view of a connector as a reading member included in the data reader shown in FIG. 1.

Referring to FIG. 7, the ID chip 30 is held by a holder 47 that is attached to a side wall of the cap 19 of the toner container 18 (see FIG. 3) and positioned between the connector 26 and the ID chip 30. As shown in FIG. 7, the holder 47 includes a first opposed portion 471 that is symmetrical relative to a vertical axis and shaped to cover an area from the upper two corners of the ID chip 30 to lateral sides of the positioning opening 46. Additionally, on the lower side, the holder 47 is shaped to cover an area beneath the lowest metal pad 44 of the ID chip board 40 (see FIG. 9A). This configuration can inhibit the ID chip 30 from falling off the holder 47.

Further, in the holder 47, a substantial area of the first opposed portion 471 is open. That is, an opening 472 is formed in the holder 47 to extend over an area opposed to the four apparatus-side terminals 32 through 34 of the connector 26. In particular, the opening 472 has a shape that includes an upward convex and extends over an area opposed to the runout preventers 311 and 312. When the toner container 18 is installed, the engagement projection 35 (positioning pin) enters the opening 472, and, proceeding to it, the runout preventers 311 and 312 enter the holder 47 via the opening 472.

A planar second opposed portion 48 opposed to the back side (on the side of the protector 401) of the ID chip 30 is attached to the holder 47. For example, the second opposed portion 48 may be bonded to the holder 47 or fitted therein using snap-fit, meaning a method of mechanically fitting a piece of metal, plastic, and the like in a given portion using elasticity of the material. The second opposed portion 48 similarly includes an upward convex opening 481 and can avoid interference with the protector 401 or the runout preventers 311 and 312 entering the second opposed portion 48. Although the ID chip 30 is pressed when the engagement projection 35 is inserted into the positioning opening 46 of the ID chip 30, the second opposed portion 48 supports the ID chip board 40 from behind, thus maintaining the contact state between the terminals.

FIG. 8 is a perspective view illustrating a state after the toner container 18 is installed in the apparatus body 13 and the ID chip 30 is positioned relative to the connector 26 of the apparatus body 13. In this state, the apparatus-side terminals 32 through 34 and the engagement projection 35 are connected to the metal pads 42 through 44 (shown in FIG. 9A) and the ground terminal 49 on the ID chip board 40, respectively. It is to be noted that, in FIG. 8, the holder 47, which is positioned between the connector 26 and the ID chip 30, and the metal pads 42 through 44 are omitted for ease of understanding.

In a sequence of actions of installation of the toner container 18, a main reference hole 192 and a sub-reference hole 193 of the cap 19 are respectively fitted around a main reference projection 51 and a sub-reference projection 52 of the cap holder 22 (see FIG. 3), and thus the position of the cap 19 is fixed. Subsequently, the positioning opening 46 of the ID chip 30 is uplifted by the tapered end of the engagement projection 35 of the connector 26 and fitted around the engagement projection 35, and the position is adjusted. Then, the lateral and vertical positions of the ID chip 30 are determined simultaneously.

Further, as shown in FIG. 10A, the pair of runout preventers 311 and 312, which is a pair of ribs and serves as the retainer, of the connector 26 enters a lower rim situated on the lateral sides of the ID chip board 40 and beneath the center of the positioning opening 46. Even if the posture of the ID chip 30 is deviated at that time as shown in FIG. 10B, the tapered faces at the ends of the ribs (runout preventers 311 and 312) contact the above-described rim, and it acts as a trigger for the ID chip board 40 to rotate, owing to the action of gravity, in a direction to make the posture vertical. Accordingly, the deviation in posture in the direction of rotation is corrected, and the ID chip board 40 is set in the posture shown in FIG. 10A. Thus, the positioning of the ID chip 30 is completed. At that time, a part (corresponding to the inner diameter portion of the positioning opening 46) of the ground terminal 49 of the ID chip 30 contacts the apparatus-side ground terminal 37 (earth terminal) of the engagement projection 35 shown in FIG. 7. Then, the ID chip 30 is grounded (conduction is secured). After the grounding is thus secured at a position P1 (shown in FIG. 5), the three metal pads 42 through 44 of the ID chip 30 contact the apparatus-side terminals 32 through 34 of the connector 26 at positions P2 (shown in FIG. 5), respectively, and data communication is enabled between the ID chip 30 and the connector 26 provided to the apparatus body 13.

As described above, a positioning mechanism having a higher degree of accuracy can be attained at a lower cost owing to the following aspects with ingenuity in the present embodiment.

1) The number of positioning openings (i.e., the positioning opening 46) formed in the ID chip board 40 is one. This configuration can suppress the processing cost of the ID chip board 40.

2) The apparatus-side ground terminal 37 (earth terminal) is on the lateral circumferential face of the engagement projection 35 and united thereto as a single component. This configuration can make the distance between the engagement projection 35 and the apparatus-side ground terminal 37 (earth terminal) practically zero, thus enhancing the positional accuracy of the ground terminal 49 relative to the apparatus-side ground terminal 37.

3) In the installation completion state shown in FIG. 8, the relative positions are determined such that the center of hole enclosed by the ground terminal 49 is aligned with the line La connecting together the curved portions (contact portions) of the three apparatus-side terminals 32 through 34 of the connector 26. This arrangement can reduce the lateral distance between the ground terminal 49 and the contact portions to nearly zero. As a result, positioning accuracy can improve when the three metal pads 42 through 44 contact the apparatus-side terminals 32 through 34.

4) The positioning opening 46 is positioned at one of multiple clearances between the metal pads 42 through 44 arranged in line (see FIG. 10A).

With this configuration, the distance between the center of the positioning opening 46 to the farthest among the metal pads 42 through 44 from the center of the positioning opening 46 can be smaller compared with a case in which the positioning opening 46 is positioned outside (above or below) the line of metal pads 42 through 44. This distance corresponds to the length of a pendulum arm.

Specifically, if the positioning opening 46 is disposed outside the line of metal pads 42 through 44, the length of the pendulum arm is equivalent in length to the three metal pads from the center of the positioning opening 46. By contrast, the distance can be reduced and equivalent in length to the two metal pads in the configuration shown in FIG. 10A. With the reduction in the length of the pendulum arm, even if the parallelism of the farthest metal pad (44 in FIG. 10A) among the multiple metal pads relative to the apparatus-side terminals 32 through 34 is deviated due to variation in mass production or the like, the deviation can be limited.

5) To address the risk that foreign substances may enter the holder 47 and get stuck between the ID chip 30 and the first opposed portion 471 and the second opposed portion 48 while the toner container 18 is stored independently, the position of the positioning opening 46 of the ID chip 30 is determined with ingenuity in the present embodiment.

Specifically, the positioning opening 46 is vertically above the center of gravity of the ID chip 30. With such relative positions, when the runout preventers 311 and 312, constructed of a pair of ribs, enter the portion lower than the positioning opening 46, which is the center of rotation, the contact with the tapered faces of the runout preventers 311 and 312 acts as a trigger to cause the ID chip board 40 to rotate to make the posture follow the vertical direction, owing to the action of gravity. That is, the positional deviation can be regulated and the posture can be adjusted. Consequently, even if the number of positioning openings (positioning opening 46) is one, the positional accuracy of the multiple metal pads 42 through 44 relative to the multiple apparatus-side terminals 32 through 34 can be enhanced simultaneously.

6) The extended portion 372 of the apparatus-side ground terminal 37 supported by the uniform diameter portion 351 is covered with the tapered portion 352. Accordingly, insertion of the extended portion 372 into the positioning opening 46 is not blocked, and the extended portion 372 can be inhibited from abutting against the periphery of the positioning opening 46, thus preventing deformation thereof.

Accordingly, the electric connection between the connector 26 of the image forming apparatus 1 and the ID chip 30 (i.e., the ID chip board 40) on the toner cartridge 15, in particular, that between the ground terminals 37 and 49, can be smooth.

Additionally, since the end of the apparatus-side ground terminal 37 emerges from the end of the uniform diameter portion 351, that is, from the position where tapering starts, the ID chip board 40 can be grounded at an early stage in insertion of the ID chip board 40.

For example, if the end of the apparatus-side ground terminal 37 starts bulging midway the uniform diameter portion 351, the ID chip board 40 is not grounded until it is inserted to that position. If other terminals (apparatus-side terminals 32 through 34 that are reading terminals) unintentionally contact other portions, overcurrent arises and data may be damaged. However, such inconveniences can be inhibited with this configuration.

7) The amount by which the apparatus-side terminals 32 through 34 (reading terminals) projects from the connector body 31 (reading member base) of the connector 26 is smaller than the amount by which the end of the apparatus-side ground terminal 37 projects from the connector body 31 (base) of the connector 26. That is, the end of the apparatus-side ground terminal 37 projects from the connector body 31

(base) of the connector 26 an amount greater than the projecting amount of the apparatus-side terminals 32 through 34 (reading terminals).

In this case, after the apparatus-side ground terminal 37 contacts the ground terminal 49 of the ID chip 30 and grounded reliably, the apparatus-side terminals 32 through 34 (reading terminals) contact the ID chip board 40. With this configuration, the end of the apparatus-side ground terminal 37, which projects a greater amount from the connector body 31 (base) of the connector 26, can contact the ground terminal 49 of the ID chip 30 before the reading terminals contact the ID chip 30. Subsequently, the apparatus-side terminals 32, 33, and 34 (reading terminals) contact the metal pads 42, 43, and 44 (contact terminals) of the ID chip board 40, respectively. Thus, the electric circuit on the ID chip 30 can be grounded at an early stage, and electrical floating can be prevented. Accordingly, damage to the electric circuit on the ID chip board resulting from overcurrent can be prevented reliably.

8) The columnar engagement projection 35 fits in the circular positioning opening 46. With this configuration, the elements on the apparatus-side, namely, the apparatus-side ground terminal 37 (of the engagement projection 35) and the apparatus-side terminals 32 through 34 (reading terminals), and the elements on the ID chip board 40, namely, the ground terminal 49 and the planar metal pads 42 through 44 (contact terminals) can be positioned relative to each other around the centerline of the engagement projection 35.

As described above, the aspects 1 through 8 can attain the respective effects. Accordingly, even if the areas of the metal pads 42 through 44 are reduced to reduce the cost, accuracy can be enhanced in relative positions between the multiple terminals (i.e., the metal pads 42 through 44) of the ID chip 30 including the ground terminal 49 and the apparatus-side terminals 32 through 34.

It is to be noted that, in a wedgewise surplus area between the circle of the ground terminal 49 and the rectangular metal pads 42 through 44, the lateral boundary of the protruding portions 491 and 492 adjoins the outer circumference of the circle and simultaneously parallels to the metal pads 42 through 44. This configuration can inhibit the protruding portions 491 and 492 from projecting in the vertical direction and restrict the protruding portions 491 and 492 from projecting laterally into a sliding area on both sides of the ID chip board 40 that slides on the first opposed portion 471. As a result, it is not necessary to increase the size of the ID chip board 40, and, in production, a greater number of boards can be produced from a substrate whose size is fixed. Thus, increases in the cost of the ID chip 30 can be inhibited.

As described above, according to the present embodiment, the contact-type ID chip 30 is held by the holder 47 so that the ID chip 30 can move on a virtual plane substantially perpendicular to the direction in which the metal pads 42 through 44 approach and come in contact the apparatus-side terminals 32 through 34 and the apparatus-side ground terminal 37. This configuration can inhibit contact failure resulting from improper positioning relative to the apparatus-side ground terminal 37 of the connector 26 of the apparatus body 13 even in the case in which the contact-type ID chip 30 is attached to the toner cartridge 15 removably installed in the apparatus body 13.

It is to be noted that the various aspects of the present specification can adapt to, not limited to single color copiers, multicolor image forming copiers. For multicolor image formation, the image forming apparatus includes multiple photoreceptor drums 2 to bear yellow, cyan, magenta, and black toner images, respectively, and the data readers according to the above-described embodiment can adapt to each of multiple developing devices 4 corresponding to the respective photoreceptor drums 2. This configuration can attain effects similar to those attained by the image forming apparatus 1 shown in FIG. 1 and the data reader 50 therefor.

Additionally, the image forming apparatus to which the data reader according to the above-described embodiment is applicable is not limited to copiers but can be other type image forming apparatuses such as printers, fax machines, and MFPs.

Numerous additional modifications and variations are possible in light of the above teachings. It is therefore to be understood that, within the scope of the appended claims, the disclosure of this patent specification may be practiced otherwise than as specifically described herein.

What is claimed is:

1. A data reader for use with a memory board including a memory, the memory board disposed on a removable member removably attachable to a mount of an image forming apparatus, the memory board further including a positioning opening, a ground terminal at the positioning opening, and a planar contact terminal, the contact terminal disposed parallel to the ground terminal, the data reader comprising:
    a reading terminal projecting from a reading member base to read out data from the memory;
    an engagement projection to be inserted in the positioning opening, the engagement projection disposed adjacent and parallel to the reading terminal, the engagement projection including:
    a uniform diameter portion;
    a tapered portion extending from an end of the uniform diameter portion;
    an apparatus-side ground terminal to contact the ground terminal of the memory board when the engagement projection is in the positioning opening, the apparatus-side ground terminal projecting laterally from the uniform diameter portion; and
    a recess in an outer surface of the engagement projection at the uniform diameter portion and the tapered portion, the recess extending from the uniform diameter portion to the tapered portion and stopping before a deepest surface of the recess reaches an outer surface of the tapered portion, the recess including a side wall at the tapered portion which is not parallel to an axial direction of the engagement projection, the recess having disposed therein the apparatus-side ground terminal.

2. The data reader according to claim 1, wherein the reading terminal projects from the reading member base by an amount smaller than an amount by which an end of the ground terminal projects from the reading member base.

3. The data reader according to claim 1, wherein the positioning opening is circular to fit around the engagement projection that is cylindrical.

4. The data reader according to claim 1, wherein the reading member base comprises a runout preventer including a pair of ribs positioned beneath the engagement projection and across the engagement projection from each other, the ribs each including a tapered face on a lateral inner side of an end thereof, and
    lateral end faces of a lower portion of the memory board lower than a center of the positioning opening fit between the tapered faces in a state in which the engagement projection fits in the positioning opening.

5. The data reader according to claim 4, wherein the removable member is a container to contain developer.

6. The data reader according to claim 1, wherein the ground terminal of the memory board forms an inner circumferential wall enclosing the positioning opening.

7. The data reader according to claim 1, wherein a containing recess is formed in the engagement projection to accommodate the extended portion of the apparatus-side ground terminal.

8. An image forming apparatus comprising the data reader according to claim 1.

9. The data reader according to claim 1, wherein:
the deepest surface of the recess does not have a common edge with an outer surface of the tapered portion.

10. The data reader according to claim 1, wherein:
said side wall of the recess is perpendicular to the axial direction of the engagement projection.

* * * * *